United States Patent [19]

Wagener et al.

[11] Patent Number: 5,290,895
[45] Date of Patent: * Mar. 1, 1994

[54] POLYMERIZED DIENES PREPARED BY STEP PROPAGATION, CONDENSATION TYPE POLYMERIZATION OF ACYCLIC DIENES

[75] Inventors: Kenneth B. Wagener; James M. Boncella, both of Gainesville, Fla.; Robert P. Duttweiler, Somerville, N.J.; Marc A. Hillmyer, Pasadena, Calif.; Jan G. Nel, Sanderland, Mass.

[73] Assignee: University of Florida, Gainesville, Fla.

[*] Notice: The portion of the term of this patent subsequent to May 5, 2009 has been disclaimed.

[21] Appl. No.: 982,059

[22] Filed: Nov. 25, 1992

Related U.S. Application Data

[60] Continuation of Ser. No. 647,799, Jan. 30, 1991, abandoned, which is a division of Ser. No. 462,532, Jan. 3, 1990, Pat. No. 5,110,885.

[51] Int. Cl.$^5$ .................................... C08G 61/04
[52] U.S. Cl. ................................ 526/336; 526/170; 526/335
[58] Field of Search .................... 526/170, 336, 335

[56] References Cited

U.S. PATENT DOCUMENTS

| | | | |
|---|---|---|---|
| 3,019,213 | 1/1962 | Moody | 526/340.3 X |
| 3,597,406 | 8/1971 | Calderon | 526/142 |
| 3,728,325 | 4/1973 | Carlson et al. | 526/340.3 X |
| 3,790,546 | 2/1974 | Schön et al. | 526/169 X |
| 3,926,933 | 12/1975 | Naylor | 526/335 X |
| 4,931,376 | 6/1990 | Ikematsu et al. | 526/335 X |
| 5,110,885 | 5/1992 | Wagener et al. | 526/170 |

OTHER PUBLICATIONS

Wagener et al., Macromolecules, 24(23) 6073-78 (1991).
Wagener et al., Macromolecules, 24(19) 5273-77 (1991).
Bauch et al., Makromol. Chem., Rapid Commun., 12, 413-17 (1991).
Wagener et al., Makromol. Chem., Rapid Commun., 12, 419-25 (1991).
Wagener et al., Rubber chem. and Tech., 64(1) 83-95 (1991).
Wagener et al., Macromolecules, 24(10) 2649-57 (1991).
Wagener et al., Poly. Preprints, 32(1) 373-74, 375-76, 379-80, 445-446 (1991).
Wolf et al., Poly. Preprints, 32(1), 535-36 (1991).
Brzezinska et al., Poly. Preprints, 32(1) 381-82 (1991).
Bauch et al., Poly. Preprints, 32(1), 377-78 (1991).
Brzezinska et al., Macromolecules, (submitted 1991).
Patton et al., Polymer Preprints, (submitted 1991).
Konzelman et al., Poly. Preprints (submitted 1991).

*Primary Examiner*—Fred Teskin
*Attorney, Agent, or Firm*—Kerkam, Stowell, Kondracki & Clarke

[57] ABSTRACT

Novel polymerized dienes prepared by the step propagation, condensation type polymerization of acyclic dienes employing Lewis acid-free metal alkylidene complexes as catalysts.

1 Claim, 1 Drawing Sheet

POLYMERIZED DIENES PREPARED BY STEP PROPAGATION, CONDENSATION TYPE POLYMERIZATION OF ACYCLIC DIENES

STATEMENT OF RIGHTS TO INVENTION MADE UNDER FEDERALLY SPONSORED RESEARCH

The present invention was made under research sponsored by the National Science Foundation-Solid State Chemistry (Grant DMR-8416511) and DARPA (URI Navy Grant N00014-86-G-0224).

This application is a continuation of application Ser. No. 07/647,799 filed Jan. 30, 1991, now which is a division of application Ser. No. 07/462,532 filed Jan. 3, 1990 (now U.S. Pat. No. 5,110,885 issued May 5, 1992).

BACKGROUND OF INVENTION

1. Field of Invention

The present invention relates to the polymerization of acyclic dienes.

2. The Prior Art

There presently exist few useful step propagation, condensation-type polymerization methods. Reaction yields must be high ($\cong 99\%$) in order for useful polymers to form. There are only approximately twenty such polymerization methods described in the prior art and none produce useful polymers at ambient or room temperature.

Recently, an attempt was made to incorporate the metathesis of olefins reaction in step propagation, condensation-type polymerization (SPCTP) chemistry to polymerize dienes [Lindmark-Hamberg et al, *Macromolecules*, Vol. 20, p. 2449 (1987)]. The dienes were exposed to a tungsten hexachloride-ethyl aluminum dichloride catalyst; however, it was found that the metathesis polymerization reaction was limited by competing vinyl addition chemical reactions.

Olefin metathesis, ring opening polymerizations of strained cycloolefins have been extensively studied over the past twenty years [Gilliam et al, *J. Amer. Chem. Soc.*, Vol. 108, p. 733 (1986); Swager et al, *J. Amer. Chem. Soc.*, Vol. 109, p. 894 (1987); Schrock et al, *Macromolecules*, Vol. 20, p. 1169 (1987); Cannizo et al, *Macromolecules*, Vol. 20, p. 1488 (1987); Novak et al, *J. Amer. Chem. Soc.*, Vol. 110, p. 960 (1988); Swager et al, *J. Amer. Chem. Soc.*, Vol. 110, p. 2973 (1988); Cannizzo et al, *Macromolecules*, Vol. 21, p. 1961 (1988); Wallace et al, *Macromolecules*, Vol. 20, p. 450 (1987); Schrock et al, *Macromolecules*, Vol. 20, p. 1169 (1987); Murzdek et al, *Macromolecules*, Vol. 20, p. 2640 (1987); Knoll et al, *J. Amer. Chem. Soc.*, Vol. 110, p. 4424 (1988); Krouse et al, *Macromolecules*, Vol. 21, p. 1885 (1988); Wallace et al, *J. Amer. Chem. Soc.*, Vol. 110, p. 4964 (1988)]. Olefin metathesis reactions and catalysts suitable therefor are also described in U.S. Pat. Nos. 4,727,215; 4,681,956 and 4,427,595.

It is an object of the present invention to provide a high yield, efficient olefin metathesis, SPCTP process for polymerizing acyclic dienes to produce novel high molecular weight polymeric products having properties and characteristics not possessed by similar products prepared according to other methods.

SUMMARY OF THE INVENTION

These and other objects are realized by the present invention which provides novel polymers prepared by the step propagation, condensation-type polymerization of an acyclic diene which comprises contacting the diene with a catalyst having the formula:

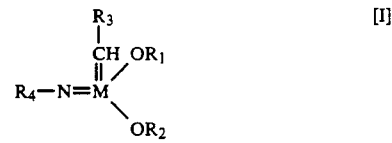

wherein:

$R_1$, and $R_2$ and $R_3$ may be the same or different and are alkyl, aryl, aralkyl, haloalkyl, haloaryl, haloaralkyl or a silicon-containing analog thereof;

$R_3$ is alkyl, aryl, aralkyl or a substituent resulting from the reaction of the $M=CH-R_3$ moiety of the catalyst with an acyclic diene being polymerized; and M is W or $M_o$ at a temperature and for a time sufficient to effect polymerization of the diene and recovering the polymerized diene.

Novel polymeric products having degrees of polymerization above about 10 to greater than 1,000X are produced by the above-described method. These novel polymers display chemical and physical characteristics and properties not shared by polymers produced by polymerizing the same monomers according to other methods.

DETAILED DESCRIPTION OF THE INVENTION

Figure 1:
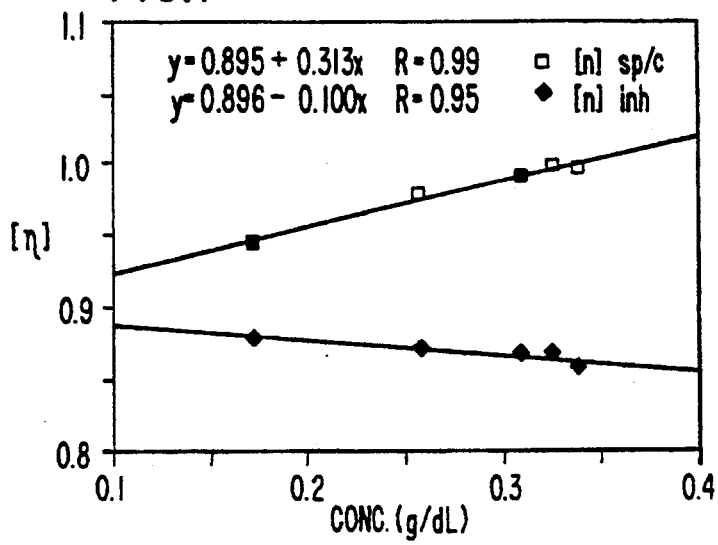
FIG. 1 depicts the viscosity of polyoctenamer produced according to Example I.

For purposes of the invention described in the present specification and in the claims, the following definitions apply:

"Step propagation, condensation-type polymerization" (SPCTP), as used herein, refers to the intermolecular, self-metathesis polymerization of acyclic dienes, which method yields a non-polymeric by-product which can be removed from the reaction medium to drive the polymerization reaction. The term is not intended to embrace and specifically excludes the so-called "olefin metathesis polymerization" of strained cycloolefins and the so-called "vinyl addition" reactions of olefins.

"Acyclic dienes", as used herein, refers to dienes, the polymerization of which according to the above-described SPCTP method do not involve ring-opening to produce the polymeric product, i.e., the diene portion of the molecule undergoing polymerization is acyclic. Although the term includes dienes which may contain cyclic substituents, including cyclo-diene groups, the latter are non-functional in the sense that they do not participate in and remain unaffected by the polymerization reaction.

"Aryl", as used herein, refers to hydrocarbyl (i.e., containing only carbon and hydrogen) aromatic groups, e.g., phenyl, naphthyl, etc.

"Ambient temperature", as used herein, refers to room temperature.

"Elevated temperature", as used herein, refers to temperatures above ambient temperature up to temperatures at which the reactants and catalyst employed in the SPCTP reaction and the polymeric products produced thereby are stable.

"Degree of polymerization", as used herein, refers to the number of recurring or repeating units in the polymeric produced by the SPCTP of the acyclic diene monomers.

The catalysts employed in the method of the invention and methods for their manufacture are described in U.S. Pat. Nos. 4,681,956 and 4,727,215, the entire contents of which are incorporated herein by reference.

The present invention is predicated on the discovery that certain catalysts enable the SPCTP of acyclic dienes to produce high molecular weight, novel polymeric products. Although it is known that some of these catalysts catalyze olefin metathesis reactions, it was unexpected that they would catalyze the SPCTP-type polymerization of acyclic dienes since vinyl-type and other types of polymerization do not occur.

The proper choice of catalyst eliminates vinyl addition in favor of SPCTP mechanisms in acyclic diene polymerization which lead to novel, high molecular weight polymeric products. The catalysts are of the M(VI) alkylidene complex type which are Lewis acid-free. The Lewis acid-free catalysts virtually eliminate the vinyl addition reactions and, at the same time, unexpectedly greatly enhance the SPCTP reaction to produce highly polymerized diene.

In most cases, the polymerizations occur at ambient temperatures. The reaction temperatures may be elevated to drive the reaction to completion faster or to produce higher degrees of polymerization. Generally, temperatures in the range of from about $-50°$ C. to about 300° C. may be employed, although, it will be understood by those skilled in the art that the optimum temperature in each case will depend upon the identity and nature of the acyclic diene, catalyst, solvent (if any) and polymer products.

Those skilled in the art will also be able to determine the optimum reaction times in each case, although the polymerization reactions generally go to completion in from about 1 to about 10 hours.

Although any acyclic diene which does not contain substituents which sterically or functionally interfere with the polymerization reaction may be polymerized according to the method of the invention, it is generally preferred to employ dienes having the formula

Wherein:
$R_5$, $R_6$, $R_7$, and $R_8$ may be hydrogen, halogen or substituted or unsubstituted alkyl groups having from 1 to 5 carbon atoms, any substituents on the alkyl group being such that they do not interfere with the polymerization of the diene, and
$R_9$ and $R_{10}$ may be any substituent which does not interfere with the polymerization of the diene, and
Q may be any bridging group between the ene moieties which does not interfere with the polymerization of the diene.

Preferably $R_5$, $R_6$, $R_7$ and $R_8$ should be small molecules since it is their removal which drives the polymerization to completion. The smaller these molecules, the easier their removal from the polymerization reaction medium. Most preferably, these groups are hydrogen, methyl, bromo or fluoro.

Preferably, $R_9$ and $R_{10}$ are H, alkyl, aryl, alkaryl or aralkyl.

Q preferably is an alkylene or arylene group which may be substituted with substituents that do not materially affect the polymerization reaction.

Most preferably, the method of the invention may be utilized to polymerize 1,9-decadiene, 1,5-hexadiene, divinylbenzene and mixtures of 1,5-hexadiene and 1,9-decadiene.

The polymerization of dienes of formula (II) according to the method of the present invention, produce polymers containing the recurring unit:

Wherein:
n is the degree of polymerization and is an integer in the range of from about 10 to about 1000 and $R_6$, $R_9$ and Q has the meanings ascribed above; and a compound having the formula:

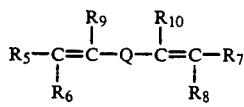

wherein:
$R_5$, $R_{10}$, $R_7$ and $R_8$ have the meanings ascribed above.

The efficiency of the polymerization reaction is enhanced by continually removing compound (IV) from the reaction medium as it is produced, since the removal thereof drives the reaction to completion.

The polymerization reaction may also be conducted in the presence of a solvent for the monomer and/or the catalyst and/or the product polymer. Suitable solvents include any aprotic solvent which does not deleteriously affect the polymerization reaction, e.g., chlorobenzene, toluene, benzene, hexane, pentane, etc. It is generally preferred to conduct the reaction in the absence of a solvent, i.e., as a bulk polymerization.

Preferably, the polymerization reaction is conducted in a reaction medium wherein the mole weight ratio of acyclic diene to catalyst is in the range of from about 50:1 to about 10,000:1. Those skilled in the art will be able to determine the optimum reactant:catalyst ratio for a specific polymerization reaction without undue experimentation.

The invention is illustrated by the following non-limiting examples.

EXAMPLE 1

In this example, 1,9-decadiene was polymerized employing the catalyst having the formula:

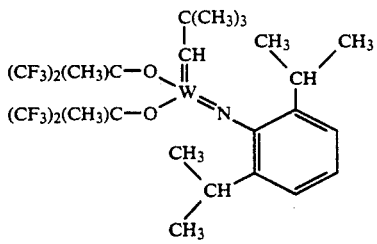

The catalyst was prepared according to the procedures described in U.S. Pat. Nos. 4,727,215 and 4,681,956 and in the literature [Schaverien et al, *J. Amer. Chem. Soc.*, Vol. 108, p. 2771 (1986); Schrock et al, *J. Amer. Chem. Soc.*, Vol. 110, p. 1423 (1988)].

The monomer, 1,9-decadiene, was dried over calcium hydride, then subjected to four freeze thaw vacuum cycles to remove dissolved gases. In order to further insure absolute dryness, it was transferred in a vacuum line to a flask containing a potassium mirror, where it was stirred for approximately one hour. This highly purified monomer was then transferred under vacuum to breakseal ampules.

The catalyst was dissolved in pentane for transfer to the reaction vessel. Three aliquots of the catalyst solution were sealed in breakseal ampules, then the monomer and the three catalyst ampules were joined to a single reaction vessel, which itself was connected to a high vacuum line ($10^{-6}$ mm Hg).

Polymerizations were conducted by first transferring the catalyst solution from the breakseal ampule to the reaction vessel, then removing the solvent (hexane, in this case). A solid deposit of catalyst residue remained, and monomer was introduced from the breakseal ampule directly to the reaction vessel containing the catalyst. Upon addition of the monomer, a gas was released instantly, which was determined to be ethylene by GC mass spectrometry. The gas was removed and condensed in a liquid nitrogen trap, which had been built into the vacuum line system. The monomer also distilled but was trapped, and returned into the reaction vessel by a partial condenser, and the reaction was continued for roughly 10 hours and after this period, a second addition of catalyst was made by breakseal techniques. Polymerization continued at room temperature for approximately 6 hours, after which the product turned solid. The liquid state was maintained by increasing the reaction temperature in 5 degree increments up to 50° C., and it was possible to continue the polymerization under bulk conditions to a temperature of about 50° C. Since the catalyst remains active at that temperature, this was maintained as the polymerization temperature. Polymerization was continued for another 24 hours using toluene as solvent, and the reaction was terminated by exposure to the atmosphere. The polymer was dissolved in refluxing benzene and precipitated in methanol, producing a while solid.

$^1$H NMR 200 MHz and $^{13}$C NMR 50 MHz spectra were obtained with a Varian XL-Series NMR Superconducting Spectrometer system. Intrinsic viscosities were determined using an Ostwald dilution viscometer at 25° C. with toluene as the solvent. Elemental analyses were carried out. DSC data were obtained with the Perkin-Elmer 7 Series Thermal Analysis system, equipped with a data station. The instrument was calibrated by a two point method using cyclohexane and indium. Dry argon was used as purge gas, and a scan rate of 10° C. per minute was used. Infrared analyses were performed using a Perkin-Elmer 281 Infrared Spectrophotometer with KBr pellets.

Only two products result from this reaction, pure polyoctenamer, and the gas ethylene, which is removed to drive the polymerization reaction. No accompanying reactions were observed, meaning that vinyl addition chemistry has been completely eliminated by the choice of catalyst. FIG. 1 shows intrinsic viscosity data for the product of this reaction, wherein the data were obtained in toluene at 25° C., and in work with lower molecular weight versions of polyoctenamer, an intrinsic viscosity of 0.9 dL/g has been shown to be equivalent to a viscosity average molecular weight of at least 50,000.

Figure 2:
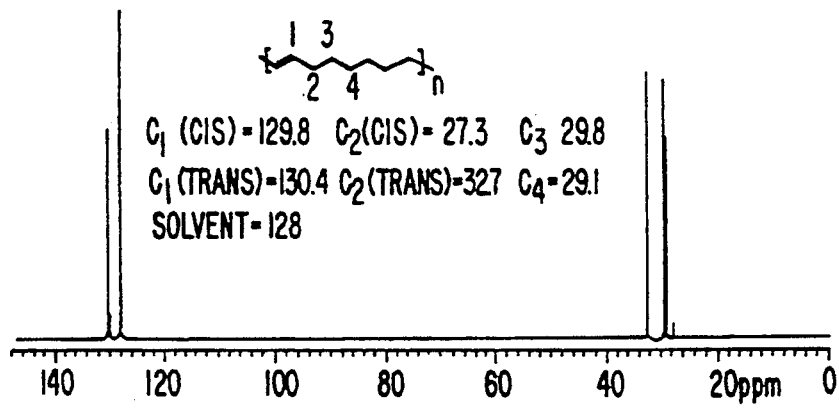
FIG. 2 represents the $^{13}C$ NMR of 92% trans polyoctenamer produced according to Example I.

FIG. 2 shows the carbon NMR spectrum for the product of this reaction and indicates that a high degree of stereochemical purity results. The polymer is at least 92% trans in its stereochemistry, a fact which is displayed by the solid state properties of the polymer itself. No other products are observed, again indicating that the reaction chemistry is extremely "clean".

All resonances can be assigned and all are appropriate only for a perfectly linear polyoctenamer repeat unit [Katz et al, *Tetrahedron Letters*, Vol. 47, p. 4247 (1976)].

Figure 3:
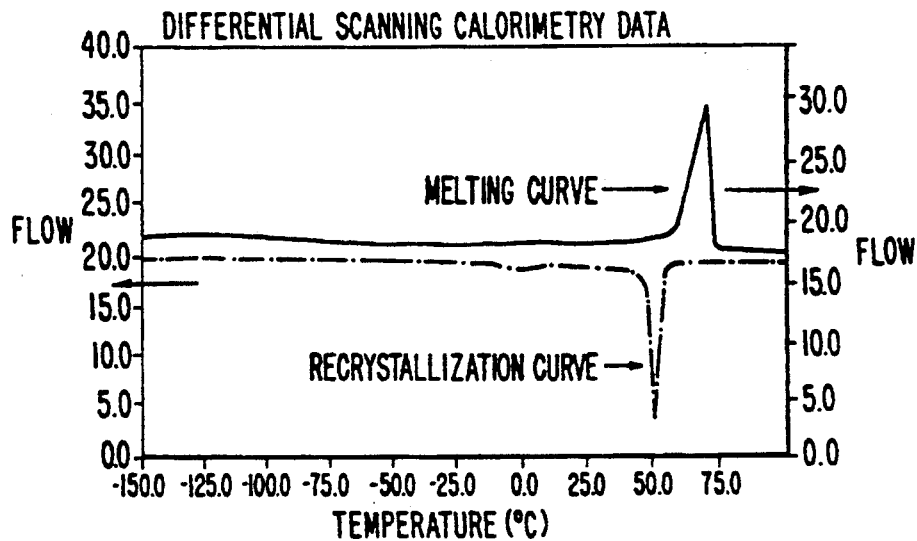
FIG. 3 sets forth differential scanning calorimetry data for the product of Example I.

FIG. 3 illustrates the thermal behavior of this polymer, both in terms of its heating and cooling characteristics. Whereas polyoctenamers produced commercially display elastomeric properties, with trans contents between 60-80% [Drayler, *Kautschuk U. Gummi Kunststoffe*, Vol. 12, p. 1037 (1983); Calderon et al, *J. Polym. Sci.: Part A-2*, Vol. 5, p. 1283 (1967)], the 92% trans polyoctenamer produced by acyclic diene metathesis polymerization is a rigid solid. A melting point is observed at 68° C., more than 15 degrees higher than any other melting point reported previously for this polymer [Sato et al, *J. Macromol. Sci.-Chem.*, Vol. A-11(4), p. 767 (1977)]. Further, the polymer recrystallizes at around 50° C. in a very precise manner, and this melting/recrystallization behavior can be cycled repeatedly.

Elemental analyses are precisely the values that are calculated for polyoctenamer structure, and again indicate the purity of the reaction itself. Further, the infrared spectra display the expected absorptions for polyoctenamers.

We claim:

1. A polymerized diene prepared by the step propagation, condensation type polymerization of an acyclic non-conjugated diene which comprises contacting said diene with a catalyst having the formula:

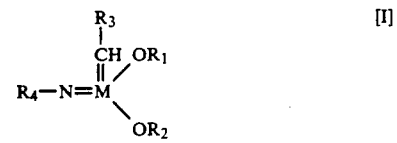

wherein $R_1$, $R_2$ and $R_4$ may be the same or different and are alkyl, aryl, aralkyl, haloalkyl, haloaryl, haloaralkyl or a silicon-containing analog thereof;

$R_3$ is alkyl, aryl, aralkyl or a substituent resulting from the reaction of the M=CH—$R_3$ moiety of said catalyst with the acyclic non-conjugated diene being polymerized; and M is W or Mo at a temperature and for a time sufficient to effect said polymerization of said diene and recovering said polymerized diene.

* * * * *